Nov. 9, 1954    C. J. LEISY ET AL    2,693,931
SELF-CLOSING VALVE WITH RETARDING DEVICE AUTOMATICALLY
REGULATED ACCORDING TO FLOW VELOCITY
Filed March 21, 1952    5 Sheets-Sheet 1

INVENTORS.
CLIFFORD J. LEISY
JOHN L. EMERICK
CLIFFORD H. JENKINS
BY
Reynolds, Beach & Christensen
ATTORNEYS

INVENTOR.
CLIFFORD J. LEISY
JOHN L. EMERICK
CLIFFORD H. JENKINS
ATTORNEYS

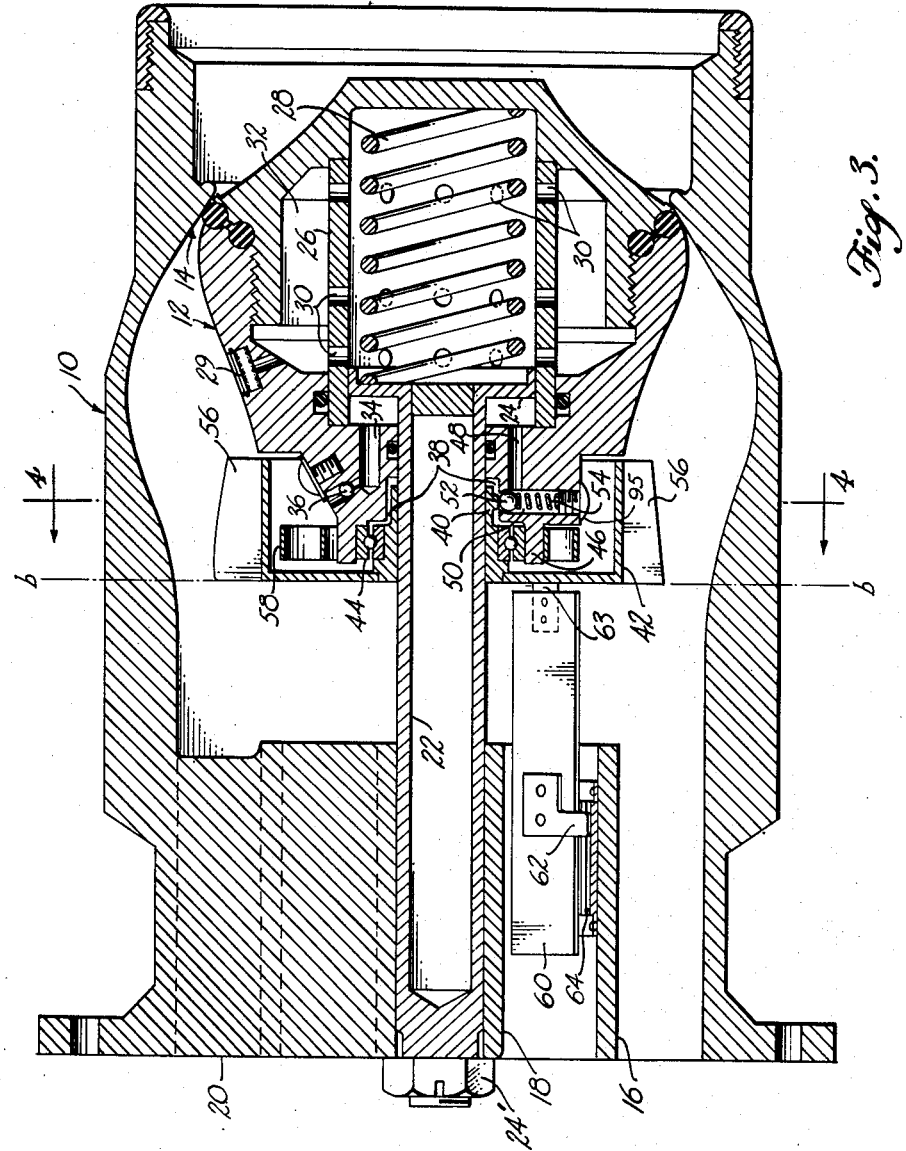

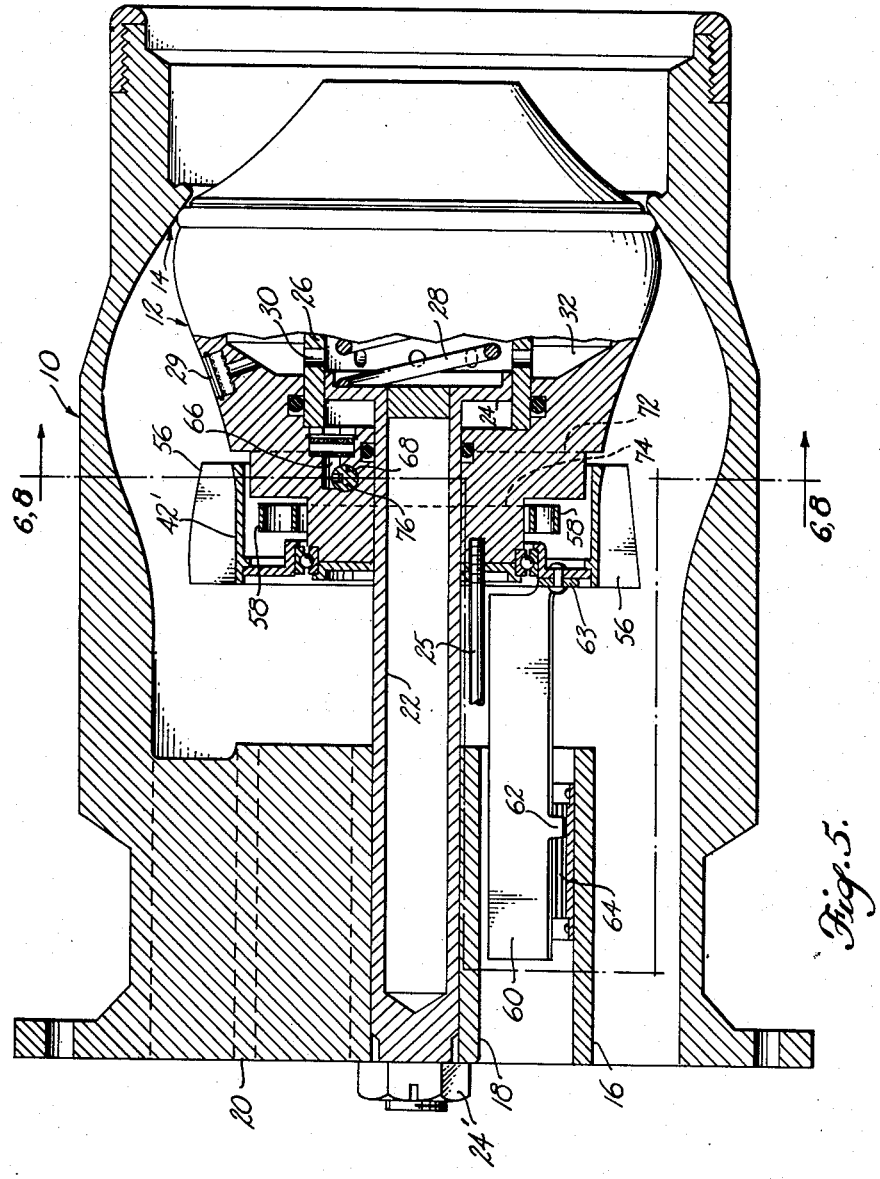

Nov. 9, 1954  C. J. LEISY ET AL  2,693,931
SELF-CLOSING VALVE WITH RETARDING DEVICE AUTOMATICALLY
REGULATED ACCORDING TO FLOW VELOCITY
Filed March 21, 1952  5 Sheets-Sheet 5

INVENTORS.
CLIFFORD J. LEISY
JOHN L. EMERICK
CLIFFORD H. JENKINS
BY
Reynolds, Beach & Christensen
ATTORNEYS

United States Patent Office 2,693,931
Patented Nov. 9, 1954

2,693,931

SELF-CLOSING VALVE WITH RETARDING DEVICE AUTOMATICALLY REGULATED ACCORDING TO FLOW VELOCITY

Clifford J. Leisy, John L. Emerick, and Clifford H. Jenkins, Seattle, Wash., assignors to Boeing Airplane Company, Seattle, Wash., a corporation of Delaware Application March 21, 1952, Serial No. 277,806

19 Claims. (Cl. 251—50)

This invention relates to apparatus for controlling the rate of closure of a cut-off valve in a liquid transfer system wherein the valve otherwise tends to close so abruptly as to create shock waves sometimes known as "water hammer" in the system, and excessive pressure rise due to surge effect of the liquid back of the valve, and especially wherein the shock and surge condition is aggravated by surge pressure reacting on the valve and tending to accelerate its rate of closure cumulatively. The pressure rise may be destructive or otherwise objectionable in certain types of systems wherein large quantities of liquid are being transferred at high velocities at the instant of cut-off.

The invention, more specifically, provides a means for limiting the rate of closure of a poppet valve or other "free-closing" valve, as that term is hereinafter defined, such that the water hammer effect is avoided and abnormal pressure head developed by sudden conversion from velocity head of the liquid during valve closure is kept below a maximum safe value, yet without retarding the valve action more than necessary for the foregoing purpose. The problem of limiting rate of flow reduction in this manner without overly retarding valve closure movement is complicated by the variability of liquid velocity in systems wherein this type of control may be needed. This is true for the reason that the two effects mentioned are a function of existing or initial velocity of the liquid flowing past the valve immediately before the action takes place.

An example of a liquid transfer system wherein the present type of control is applicable is an in-flight refueling system for airplanes. The period of contact between the tanker airplane and the refueled craft should be as brief as possible, which calls for transfer of large volumes of liquid fuel at very high rates. If it becomes suddenly necessary to break the contact in an emergency during the refueling operation, or in some instances even at the normal termination thereof, depending upon the manner of operation of the transfer system, flow of the inflammable liquid must be abruptly cut off so as to minimize wasteful and dangerous spillage. The rate of cut-off must be limited, however, because of the inability of liquid hydraulic transfer apparatus and connected devices suitable for airborne use to withstand the tremendous surge pressures and any water hammer effect which could result from completely unretarded valve closure in such situations. On the other hand overly retarded valve action cannot be tolerated in view of the dangers attending spillage. A means of control, effecting the minimum necessary amount of retardation of cut-off in such installations is therefore indicated.

The problem of control is complicated in the illustrative case as in others by the variability of flow velocity in the system. The problem of control is further complicated by the requirements of rugged construction, compact organization and arrangement of parts and combinations thereof, lightness of weight, reliable action and other rigid specifications applicable to airborne and similar equipment. Moreover, in those fuel transfer installations having an elongated transfer conduit on the tanker airplane, remoteness of the poppet valve at the outer extremity of the conduit imposes further limitations or requirements as to the nature of control apparatus which may be used successfully.

The present invention is herein illustratively described by reference to its application in a fuel transfer system of the type mentioned above, and its general object is a valve closure control solving the problems and being adequate to the requirements mentioned, in addition to others. However, it will be readily apparent to those skilled in the art that various changes and modifications may be made in the preferred apparatus illustrating the inventive principles involved, without departing from such principles or features of the invention to which the appended claims are particularly directed.

The terms "valve" or "free-closing valve" to which the invention is directed are intended to convey the main idea, unless otherwise qualified in their context, that the valve is of any type which tends to close so rapidly that a surge pressure is created back of the valve which may be excessive in the particular system in the absence of control action limiting or controlling rate of closure of the valve. Broadly viewed, it is immaterial whether the valve be otherwise restrained or unrestrained in its closure movement, or whether its rate of closure tends to be accelerated by surge effect back of the valve, or whether the valve is motivated by some other closing force, although design details of the apparatus might vary to meet differing situations or because of preference.

Viewed still more broadly, the present invention envisages a type of automatically regulated retarding control which may be applied in any appropriate system characterized by the existence of a variable condition, whether liquid velocity, physical movement of an object, or other force condition, which is to be suddenly changed or reduced by a movable element, such as a valve, from any of different possible initial values to a final value, and during the progress of effecting such a change the movable element or valve, if unretarded, tends to act more quickly than desired, such that a dangerous or objectionable force reaction takes place in the system to a degree dependent on the initial value of the variable condition being changed.

In accordance with the invention, the degree of restraint applied to the valve as herein illustrated is based directly and automatically upon the velocity of flow past the valve at the initiation of valve closure movement. In this way the retarding action achieved is limited automatically to an amount not appreciably in excess of that necessary to prevent objectionable momentum effects, so that the valve is permitted to close as rapidly as permissible in the circumstances.

In its illustrated form the closure control apparatus comprises a valve-retarding dashpot arrangement whereby the flow of damping fluid to or from the dashpot cylinder through an escape port is controlled by port-constricting means urged toward closed position with a force related to velocity of liquid flowing in the system past the valve, and spring means resiliently opposing this liquid-velocity force. The position of the port-constricting means when a balance exists between the velocity force and spring force just prior to appreciable movement of the free-closing valve, hence the damping effect of the dashpot means, is therefore a function of initial liquid velocity. The apparatus additionally comprises means automatically operable during initiation of closure movement of the valve to lock the port-constricting means in such force-balance position, so as to preserve the initial degree of damping imposed on the valve during the remaining closure movement. The greater the initial velocity of the liquid in the system at the commencement of cut-off, the greater the retarding effect of the control apparatus. On the other hand, should the liquid velocity in the system happen to be relatively low at the instant of valve closure, the minimum amount of retardation of the valve sufficient and necessary to prevent excessive surge pressure is correspondingly less and is satisfied by the automatic control apparatus which responds to initial velocity. Moreover, because of the action of the locking means, the resistance setting or restraint on the valve effected by the automatic control apparatus based on initial velocity is not disturbed by the velocity and pressure changes attending valve closure, as desired.

In the preferred form of the invention the valve is permitted to move relatively freely, that is without spe-_ cial control restraint, through a substantial initial fraction of its total travel to closed position, inasmuch as the surge and water hammer effects are not felt to a material degree until the valve is nearly closed. Thus ordinary dashpot control imposes a light restraint on the valve during its initial travel, without reference to liquid velocity in the conduit, whereas during the final or critical travel of the valve its movement is more heavily retarded in accordance with the control arrangement mentioned above.

These and other features, objects and advantages of the invention including certain details of the preferred forms thereof as applied to the type of system specifically mentioned above will become more fully evident from the following detailed description by reference to the accompanying drawings.

Figure 3 is a longitudinal sectional view of the same, the portion of which to the right of line b—b is taken on line 3—3a in Figure 4, and the portion of which to the left of the line b—b in Figure 3 is taken on line 3—3B in Figure 4, the poppet valve being shown in closed position.

Figure 5 is a longitudinal sectional view of the conduit and valve combination incorporating a modified form of control apparatus, the view being taken on line 5—5 in Figure 6 and the valve being shown in closed position.

Figure 1:
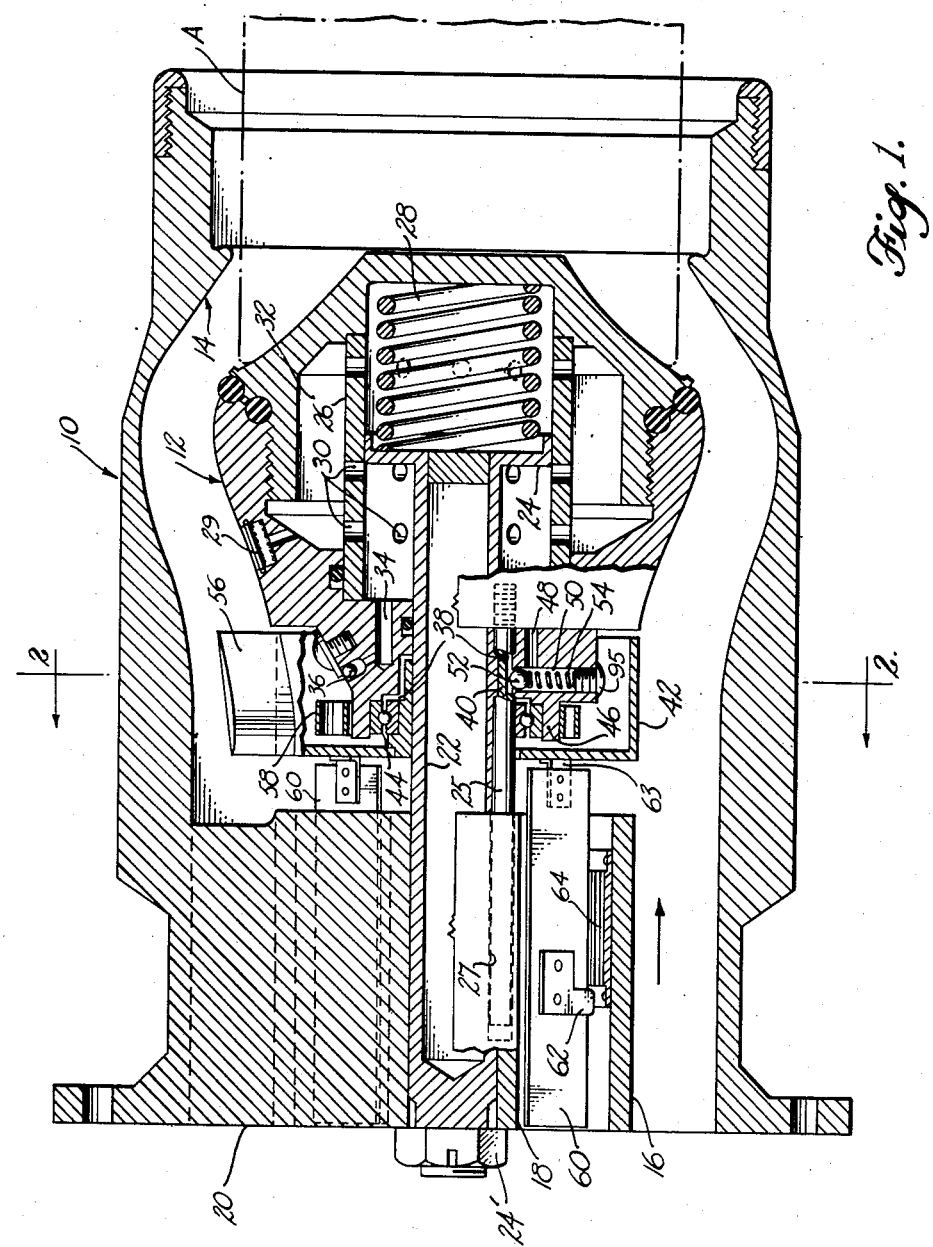
Figure 1 is a longitudinal section of the discharge end portion of an existing type of liquid fuel transfer conduit containing a poppet valve shown in open position, and valve closure control apparatus as employed in the illustrative case, the view being taken on line 1—1 in Figure 2.

In the existing fuel transfer system serving as the basis of illustration for the present invention, the tanker airplane carries a trailing boom or fuel transfer conduit (not shown in its entirety) by which contact is made with the refueled craft flying in prescribed formation with the tanker. The outer end of the tanker boom comprises a nozzle adapted to seat in a mating receptacle in the refueled airplane. In Figure 1 herein the tanker airplane boom nozzle comprises the conduit section 10 which is normally closed (Figure 2) by the poppet valve 12, but is opened by a suitable valve-opening receptacle abutment A (shown by broken lines in Figure 1) when contact with the refueled airplane is fully established and the boom nozzle is seated in the refueling receptacle. The receptacle abutment A presses the poppet valve axially of conduit 10 away from the valve seat 14 to open the passage and allow liquid fuel to flow in the direction of the arrow through the annular conduit space surrounding the valve in open position. Because the entire refueling operation should be completed in a brief period of contact between the two airplanes, the fuel is pumped from the tanker airplane through the boom conduit at very high rates, such that sudden termination of the contact, involving abrupt retraction of the receptacle abutment A from the poppet valve 12 ordinarily permits the poppet valve to slam shut and tends to produce a heavy shock surge of liquid back of the valve caused by the latter's abrupt closure and may give rise to excessive pressure head of the liquid tending to rupture the system as well as longitudinally running shock waves, sometimes referred to as the "water hammer" effect, dangerous to the refueling boom components and possibly to other connective parts of the airplane. This surge effect must be maintained below the maximum safe or permissible value in the particular installation so that the valve should be retarded in its closure movement, and yet should not be overly retarded, because of the necessity for cutting off the flow as abruptly as possible to avoid dangerous and wasteful spillage of the fuel through the end of the conduit 10 after the fuel transfer contact with the refueled airplane is once broken.

Figure 2:
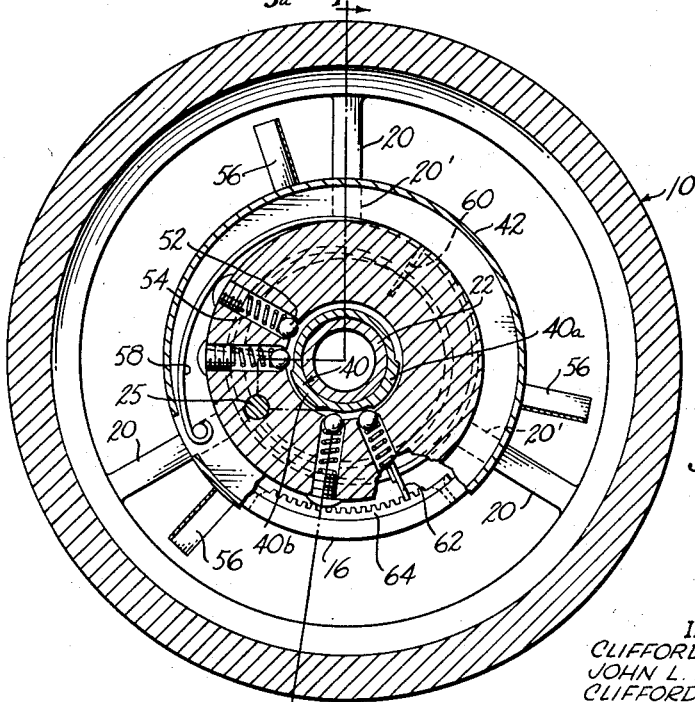
Figure 2 is a transverse sectional view of the same taken on line 2—2 in Figure 1, the automatic valve closure apparatus being shown in position of maximum retardation effect imposed on the poppet valve.
Figure 6:
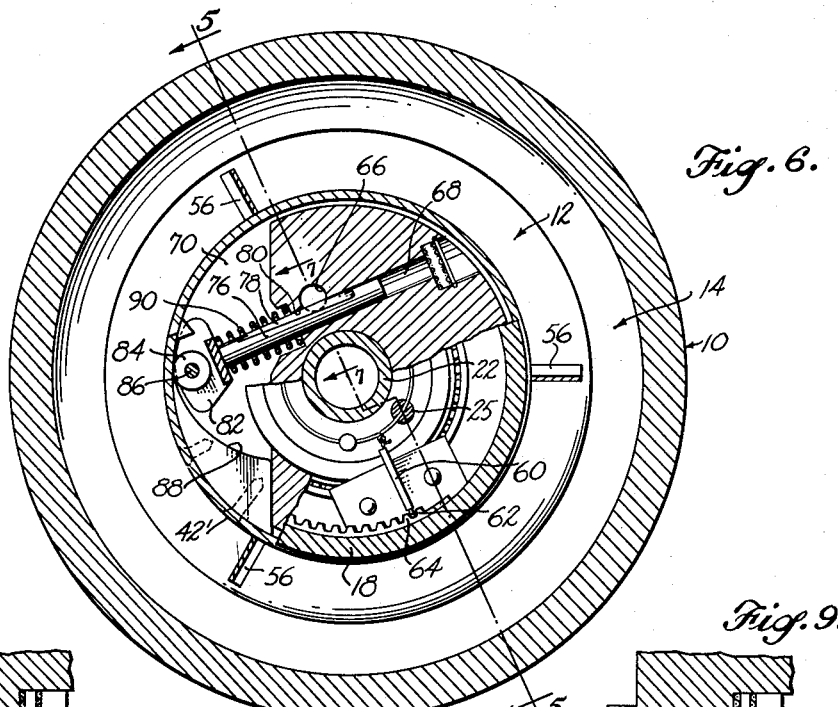
Figure 6 is a transverse sectional view taken on line 6, 8—6, 8 in Figure 5, the automatic closure control apparatus being shown in the position of minimum retardation effect imposed on the poppet valve.

In the left-hand portion of the conduit 10, as shown in Figure 1, two concentric rings 16 and 18 are rigidly mounted by thin radial arms 20 which extend lengthwise of the conduit to create minimum resistance to flow of the liquid fuel entering through the circumferentially divided annular space surrounding the outer ring 16. The inner ring 18 is supported by inward extensions 20' of the arms 20 (Figure 2). Preferably three such arms at equiangular spacing are used. A central axial shaft 22 is received in the inner ring 18 and, secured by a nut 24,' projects from the ring a substantial distance toward the discharge end of the conduit 10. The projecting end of this shaft carries an enlargement which forms a dashpot piston 24. The latter slides inside a sleeve 26 retained within the poppet valve head to function as a dashpot cylinder. The poppet valve receives support and guidance for longitudinal reciprocation in the conduit 10 by this sliding contact between the dashpot piston 24 and cylinder 26, supplemented by sliding contact between the shank portion of the shaft 22 and the left portion of the valve assembly (Figure 1). A longitudinal guide rod 25 threaded into the poppet valve projects slidably into a bore 27 (Figure 1) in the ring 18 to prevent rotation of such valve during longitudinal reciprocation thereof on the shaft 22.

A valve return spring 28 is received in the dashpot cylinder 26 to press against the inside end wall of the valve and urge it to its seat 14 by reaction of such spring from the end of the fixed piston 24. Thus when the valve is pressed open by the abutment A, the spring 28 is compressed, so as to return the valve to its seat when the refueled airplane receptacle abutment A is later withdrawn from inside the end of the tanker airplane conduit 10.

A filtered inlet 29 in the valve 12 permits liquid from the surrounding space to enter the valve interior. A series of small holes 30 in the dashpot cylinder sleeve 26 permit restricted flow of the liquid thus admitted into the annular space 32 surrounding the sleeve 26, into the interior of the dashpot cylinder. Thus during a substantial portion of the valve stroke or travel the dashpot itself affords a definite, although relatively light, amount of damping and permits sufficiently rapid but not overly abrupt movement of the valve. This fixed damping action occurs during the initial phase of valve closure movement, during which accompanying surge effect is not as great as it becomes if the valve is permitted to complete the travel to its seat at the same rate. However, when the valve is finally approaching its seat, the speed at which it travels the remaining distance has a very sharp influence on the tendency of the system to undergo the water hammer effect and to experience a large pressure rise back of the valve due to liquid momentum. Thus the initial amount of damping provided by the apertured dashpot means thus far described becomes inadequate during final approach of the valve to its seat at the higher liquid velocities in systems of this character.

It will be appreciated that unless account were taken of the flow velocity at the instant of cut off, the retarding effect which would have to be imposed on the valve during its final travel, for extremely high flow velocities, to prevent excessive surge effect in the system back of the valve, would overly retard the valve at low flow velocities and would permit more spillage than could be tolerated when refueling contact between the airplanes is being broken. While it is possible to devise a closure control mechanism which responds to liquid velocity, for the initial phase of valve closure movement as well as for the final phase thereof, within the purview of the invention, that degree of refinement is found to be unnecessary in the particular case. In other words, a fixed degree of light damping action provided by the apertured dashpot mechanism throughout the initial travel of the valve is ample for all different initial values of liquid velocity, as the valve can be permitted to move this distance as rapidly as desired without causing excessive surge effect, whereas the situation is different for the remainder of valve travel.

When the piston 24 covers the last of the holes 30 in the sleeve cylinder 26 during valve closure movement, the only escape for the damping liquid inside the cylinder, apart from special closure control provisions to be described, is through the bore 34 and out through the port of ball valve 36 into the general annular conduit space surrounding the valve. The passage 34 communicating between the interior of the dashpot cylinder and the general conduit interior is so restricted, however, that the damping action of the dashpot with this sole means of escape for the damping fluid is far in excess of the maximum which would permit the valve to travel the remaining distance to its seat with the desired speed. Nevertheless, in the event all other passages are cut off the escape passage 34 permits full movement of the valve 12 to its seat and thereby insures that the valve cannot fail to close.

In the hub or left-hand portion of the valve assembly 12 (Figure 1) there is an annular space 38 surrounding the shaft 22 and in which is mounted a cam 40 fixed on the cylindrical cowl 42 and slidably encircling the shaft. An antifriction bearing 44 rotationally supports this cam and cowl assembly from within the hub extension 46 of the valve while affording liquid passage through the space between the bearing elements or balls for communication between the annular space 38 and the general interior of the conduit 12 surrounding the valve. In turn, restricted communication between the space 38 and the interior of the dashpot cylinder sleeve 30 is afforded through a series of passages 48 in the valve hub which extend between a corresponding series of radial ball valve guide bores 50 likewise formed in such hub. These valve guide bores are closed at the outer extremity by plugs (95) upon which the return springs 54 rest. The ball valves 52, when seated by their respective return springs 54, close off the passages 48 and prevent escape of liquid from the interior of the dashpot cylinder. However, each of the ball valves 52 projects into the space 38 and into the path of the peripheral lobes 40a and 40b of cam 40, so that when relative rotation takes place between the cam and cowl assembly on the one hand, and the nonrotational valve head on the other hand, these ball valves are opened in successive order.

Figure 4:
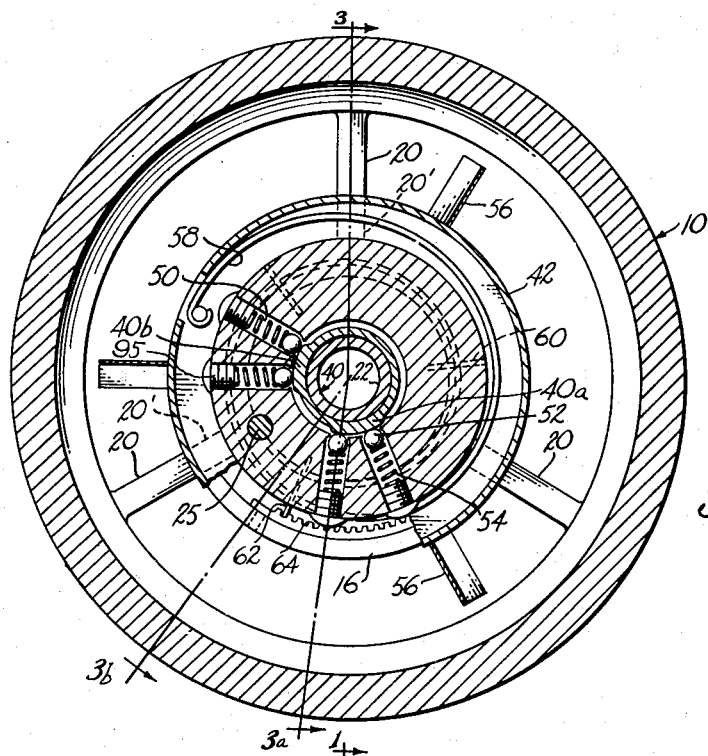
Figure 4 is a transverse sectional view taken on line 4—4 in Figure 3, the automatic closure control mechanism being shown in position of minimum retardation effect imposed on the poppet valve.

The angular position and angular width of the respective cam lobes with respect to the different ball valves is so chosen by design that the total number of ball valves open under operating conditions increases by steps or increments with progressive rotation of the cam relative to the valve. In Figure 2 all of these ball valves are closed, so that the only escape for liquid in the left-hand end of the dashpot cylinder (Figure 1) during the final travel of the valve to its seat is through the passage 34 past the ball valve 36, a free passage. On the other hand, Figure 4 illustrates the relative position of the cam and the nonrotating poppet valve 12 wherein all of the ball valves 52 are held open by the cam lobes. In different intermediate relative positionings of the cam and ball valves, one, two or three of the four valves will be held open by the cam lobes.

The cylindrical cowl 42 serves as a support for a series of inclined vanes 56 which extend radially outward from the sleeve and into the path of flow of the liquid fuel passing through the conduit 10 past the valve. These radial vanes are so inclined in relation to longitudinal planes containing the conduit axis that the flow of liquid impinging their faces produces a torque. This torque, proportional to liquid velocity, tends to rotate the cowl 42, hence the cam 40, in the direction which moves the cam from its position of Figure 4 toward its position of Figure 2, namely from its position of maximum total relief port opening past the ball valves 52, to the position of maximum flow restriction or minimum port opening, in Figure 2, wherein all of the ball valves are closed. A spiral spring 58, anchored by its inner end to the hub of nonrotating poppet valve 12, and by its outer end to the rotating cylindrical cowl 42, urges the cowl, hence the cam 40, to the position depicted in Figure 4 and opposes the torque generated by the inclined vanes 56 from dynamic reaction of the liquid flowing in the conduit. In effect, therefore, the force of the spring is continuously balanced against the velocity force acting on the vanes, so that the position of the cam 40 bears a direct relationship to the velocity of flow of liquid fuel in the conduit.

Damping vanes 60 project axially from their mounting brackets 63 on the web or end wall of the cowl 42 into the annular space formed between the inner and outer mounting rings 18 and 16, respectively. These damping vanes are disposed radially in relation to this annular space divided into segments by fixed arm extensions 20', and, during rotation of the cowl 42, set up a resistance preventing overly abrupt angular shifting and oscillation of the cowl 42 caused by sudden liquid fuel velocity changes in conduit 10.

One of the damping vanes 60 carries a radially projecting key 62. This key is positioned to engage any one of a series of keyways formed longitudinally in the arcuate plate 64 mounted on the inside wall of the outer mounting ring 16. In the open position of the valve 12 the key 62 is located past the left-hand end of the plate 64 and the cowl 42 is then free to seek an angular position of balance between the force of spring 58 and the liquid velocity force created by the vanes 56, without interference between the key 62 and any of the keyways. Thus in open position of the valve the key 62 is positioned adjacent the entrance of the keyway in arcuate plate 64 which corresponds to the existing liquid velocity in the conduit. When the valve commences to close, therefore, the key 62 enters the particular keyway and locks the cam and cowl assembly against rotation throughout the remaining travel of the valve to its seat 14. Accordingly, the resistance setting of the retarding device comprising the vane and spring controlled cam 40 and ball valves 52, determines the retardation of the valve 12 during the final or critical phase of its closure movement, and is established before appreciable closure movement of the valve takes place.

While this particular form of closure control apparatus has but four resistance settings, being the number of ball valves 52, the true or ideal control relationship may be approximated with sufficient accuracy by the resulting step function achieved with the successively actuated valves for most practical applications. The important consideration is that the retardation effect of the control during the critical phase of poppet valve closure movement be approximately related to the liquid velocity in the conduit which the valve is cutting off, in such manner that the valve closes as rapidly as permissible in accordance with conditions previously mentioned.

In the modified form appearing in Figures 5 to 9, inclusive, parts similar to those in the preceding figures are correspondingly numbered. The two forms differ in respect to the particular means by which the balancing action of the vanes 56 and the coil spring 58 is converted into the desired degree of controlled retardation imposed by the dashpot upon valve closure movement. Whereas in the first described form the degree of retardation or resistance setting of the closure control apparatus was varied by steps, determined by successive actuation of the ball valves 52, a more gradual variation is achieved in the modified form by use of a single flow-restricting valve having a variable opening adjusted by the positioning of the valve through interaction of the spring and inclined vane forces. Actually, even in this particular modified form the flow-restricting valve is adjusted by small increments, so that the control variation is not a perfectly smooth or gradual function, due to the finite width of the keyways in plate 64 engaged by the locking key 62.

In Figures 5 to 9, inclusive, flow communication between the left-hand end of the dashpot cylinder 26 is afforded through two bores in the poppet valve head, one being the bore 66 parallel to the axis of the valve, and the other being a transverse bore 68 slightly offset from but intersecting the bore 66 and extending from the bore 66 to the open space defined between shoulder surfaces 72 and 74 representing the sides of a slot cut in one side of the hub of valve 12. A rod valve 76 is slidably received in the bore 68 for longitudinal reciprocation therein. Such valve rod has a longitudinally tapered groove cut in one side thereof to register with the bore 66 and permits restricted flow of liquid between the bore 66 and the space 70 past the port-defining wall portion 80 of groove 68 lying between the bore 66 and the space 70. Because of the taper of groove 78 the longitudinally adjusted position of the rod valve 76 determines the effective opening of this port.

The end of the rod valve 76 projecting out of the bore 68 into the space 70 carries a runner plate 82 one side of which slides along the shoulder surface 72 and prevents rotation of the rod valve as it reciprocates longitudinally in the bore 68. A small roller 84 rotatively mounted on a transverse pin 86 projecting from the opposite side of the runner plate 82 rolls on the curved inner face of an arcuate cam 88, which is mounted on the inner wall of the cylindrical cowl 42' to lie in the space 70. The curvature of the inner face of cam 88 is on a progressively decreasing radius with respect to the central axis of the poppet valve 12 and conduit 10. A return spring 90 surrounding the rod valve 76 urges the roller 84 into constant engagement with the cam surface.

Figure 7:
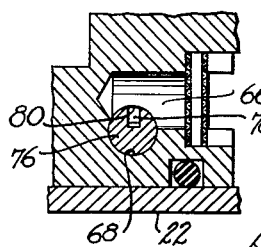
Figure 7 is a fragmentary sectional detail of a portion of the control device taken on line 7—7 in Figure 6.

The spiral spring 58 connected between the cylindrical cowl 42' and the poppet valve hub, as in the preceding form, urges the cowl, hence cam 88, in the direction of rotation which results in maximum extension of the rod valve 76 from the bore 68, wherein the roller 84 rests on or beyond the low point or maximum radius of the cam 88, and the flow restriction at 80 is a minimum (Figure 7).

Figure 9:
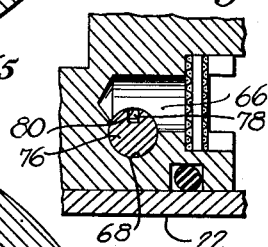
Figure 9 is a fragmentary sectional detail similar to Figure 7, but taken on line 9—9 in Figure 8.
Figure 8:
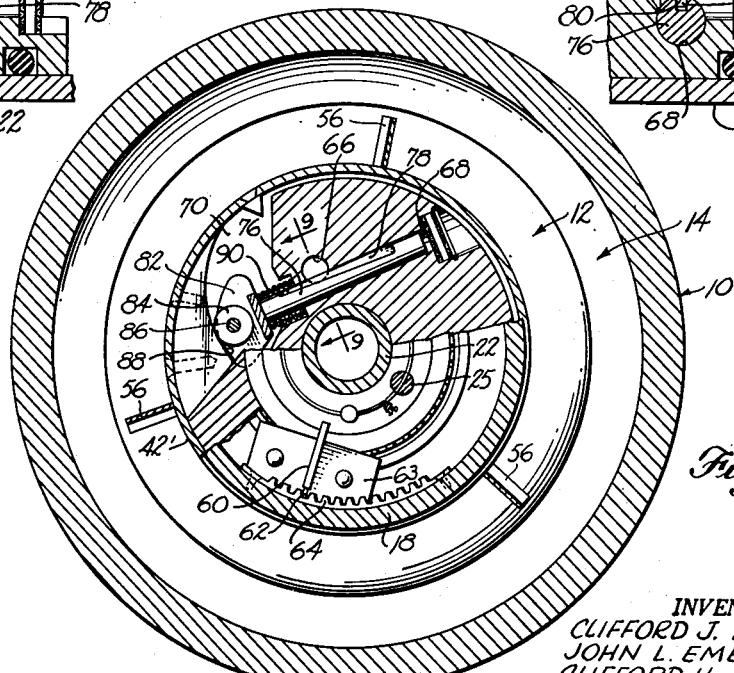
Figure 8 is a transverse sectional view taken on line 6, 8—6, 8 in Figure 5, the automatic closure control mechanism being shown in position of near maximum retardation effect imposed on the poppet valve.

As velocity of flow in the conduit 10 increases, and by reaction of the moving liquid on the inclined vanes 56, rotates the cowl 42' against the force of spiral spring 58, the cam 88 is driven progressively beneath the roller 84 and the rod valve 76 is driven further into the bore 68. This movement progressively reduces the cross section of the valve groove 78 at the port wall 80, hence increases the restriction to flow between the bore 66 and the space 70 (Figure 9). In Figure 8 the roller 84 is shown near the position of maximum displacement by the cam 88. The flow past port wall 80 is never quite cut off by the valve 76 even in this maximum displaced position, however, because the groove 78 therein still extends into the space 70. Due to this arrangement it is unnecessary in the modified form to provide a separate escape passage 34, such as that used in the previously described form, to establish a minimum communication passage between the dashpot cylinder and the general interior of conduit 10.

Obviously, the rate, whether constant or variable, of taper along the length of the rod valve 76 may be selected to produce the desired flow restricting action as a function of angular positioning of the cowl and cam assembly under operating conditions.

We claim as our invention:

1. A system for controlling the rate of change of a variable force exerting condition from various different initial values to a final value, comprising means movable from an initial position, established with said variable force exerting condition at an initial value, into a final position and, during such movement, effecting a progressive variation of said variable force exerting condition from the initial value thereof to the final value thereof, said movable means tending to move more rapidly than permissible, retardation means having a range of resistance settings operable to retard such movement of said movable means by different corresponding amounts, and retardation selecting means controlled by the variable force exerting condition and operable to select the resistance setting of said retardation means automatically in accordance with the initial value of said force exerting condition before execution of appreciable movement of said movable means from its initial position toward its final position, said retardation selecting means being provided with means effective to maintain the selected resistance setting of said retardation means throughout substantially the total of such movement to said final position.

2. A system for controlling the rate of change of a variable condition from various different initial values to a final value, comprising means movable from an initial position, assumed thereby with said variable condition at an initial value, into a final position and, during such movement, effecting a progressive variation of said variable condition from the initial value thereof to the final value thereof, said movable means tending to move more rapidly than permissible, retardation means operable to retard such movement of said movable means by selected amounts, means selectively controlling said retardation means and including a guided member and a plurality of different guiding members selectively engageable by said guided member and each corresponding to a different selected retardation imposed on said movable means, and means controlled by the variable condition before execution of appreciable movement of said movable means from its initial position toward its final position to effect engagement selectively between said guided member and one of said guiding members automatically in accordance with the particular initial value of said variable condition.

3. A system for controlling the rate of change of a variable condition from various different initial values to a final value, comprising means movable from an initial position, assumed thereby with said variable condition at an initial value, into a final position and, during such movement, effecting a progressive variation of said variable condition from the initial value thereof to the final value thereof, said movable means tending to move more rapidly than permissible, variable retardation means operable to retard such movement of said movable means by various amounts, and means controlling said retardation means to establish the amount of retardation imposed thereby on said movable means, said control means, including an element actuated by the variable condition before execution of appreciable movement of said movable means from its initial position toward its final position to establish automatically the amount of retardation in accordance with the particular initial value of said variable condition.

4. Apparatus for reducing at a controlled rate the velocity of liquid flowing in a given path from different initial velocities to a final reduced velocity, comprising free-closing valve means interposed in the path of flow and movable from open position thereof, permitting flow of liquid at different initial velocities, to closed position thereof, cutting off such flow, said valve means being of a type tending to close more rapidly than permissible, selectively variable valve-closure retardation means having a range of resistance settings representing different degrees of resistance to closure imposed thereby on said valve means, and liquid-velocity-controlled means automatically operable to select the resistance setting of said retardation means in accordance with initial velocity of the liquid and to maintain such setting during valve closure movement, said selector means comprising a guided member and a plurality of guiding members individually engageable thereby corresponding to different initial velocities of the liquid, said guided member and the guiding member selected remaining engaged during valve-closure movement.

5. Apparatus defined in claim 4, wherein the valve means moves the guided member and the selected guiding member relatively in the direction of guidance therebetween during valve-closing movement, said guiding members having respective entrance ends arrayed in a series extending parallel to initial velocity-effected selective positioning movement between said guided member and guiding members, whereby initiation of valve-closure movement automatically effects engagement between said guided member and one of said guiding members.

6. Apparatus defined in claim 4, wherein the selector means comprises vaned means urged in one direction by dynamic force of the liquid and spring means urging said vaned means oppositely, said vaned means positioning the guided member and guiding members relatively in the open position of the valve means for selective engagement between the guided member and one of the guiding members, during initial movement of said valve means toward closed position thereof.

7. Apparatus for reducing at a controlled rate the velocity of liquid flowing in a given path from different initial velocities to a final reduced velocity, comprising free-closing valve means interposed in the path of flow and movable from open position thereof, permitting flow of liquid at different initial velocities, to closed position thereof, cutting off such flow, said valve means being of a type tending to close more rapidly than permissible, selectively variable valve-closure retardation means having a range of resistance settings representing different degrees of resistance to closure imposed thereby on said valve means, and liquid-velocity-controlled means automatically operable to select the resistance setting of said retardation means in accordance with initial velocity of the liquid and to maintain such setting during valve closure movement.

8. Closure control apparatus for a free-closing valve interposed in a conduit operatively to reduce velocity of liquid flowing therein, from various initial values to a reduced final value, and wherein the valve tends to move toward closed position more rapidly than permissible, said apparatus comprising piston and coacting fluid cylinder valve-closure-retarding means, variable port means permitting restricted escape of fluid to or from said cylinder accompanying valve closure movement, and escape port control means comprising port-constricting means operable reactively to velocity of liquid flowing in the conduit, port-enlarging spring means resiliently opposing liquid velocity force acting on said port-constricting means, and port-opening locking means actuated with initiation of valve closure movement, to maintain during such closure movement the size of port established by the initial balance between the spring force and velocity reaction force prevailing immediately preceding such closure movement.

9. Apparatus defined in claim 8, wherein the port-opening locking means comprises a guided element and a plurality of guiding elements normally disengaged from said guided element but selectively engageable therewith by initiation of closure movement of the valve means, the spring-opposed port-constricting means establishing the initial relative positioning between said guided member and guiding members in open position of the valve, thereby to control selection of the particular guiding member engaged by said guided member.

10. Apparatus defined in claim 9, wherein the port-constricting means comprises a vaned rotary member disposed in the conduit to generate torque reactively to flow of liquid in such conduit, and port-closing valve means movable by unbalance between such torque and the spring force to vary the effective escape port opening thereby, and the guided element and plurality of guiding elements comprise respectively a key and a set of keyways, one being carried by the vaned rotary member, said keyways extending generally parallel to the direction of liquid conduit valve movement and being arranged in arcuate series for selective engagement by such key in accordance with initial relative positioning therebetween established by dynamic balance of the vaned rotary member and the spring means.

11. Apparatus defined in claim 10, wherein the port-closing valve means comprises a cam member moved by unbalance between the vaned rotary member torque and the force of the spring means, and a plurality of normally open port valve elements actuated to closed position in a predetermined successive order by progressive movement of the vaned rotary member reacting to progressive increase of liquid initial velocity in the conduit.

12. Apparatus defined in claim 8, wherein the port-constricting means comprises a vaned rotary member disposed in the conduit to generate torque reactively to flow of liquid in such conduit, and port-closing valve means movable by unbalance between such torque and the spring force to vary the effective escape port opening thereby.

13. Apparatus defined in claim 12, and means defining a liquid-containing annular space in the conduit, and damping vane means projecting from the vaned rotary member into such space to damp rotary movement of such member effected by surging of liquid in the conduit.

14. Apparatus defined in claim 12, wherein the port-closing valve means comprises a cam member moved by unbalance between the vaned rotary member torque and the force of the spring means, and a plurality of normally open port valve elements actuated to closed position in a predetermined successive order by progressive movement of the vaned rotary member reacting to progressive increase of liquid initial velocity in the conduit.

15. Apparatus defined in claim 12, wherein the port-closing valve means comprises a cam member movable progressively in one direction by increasing unbalance between the vaned rotary member torque and the force of the spring means caused by increasing velocity of the liquid, and a spring-returned cam-actuated valve element extending across the port opening and movable in fixed relation thereto, said valve element being formed to block escape of fluid through said port opening progressively accompanying movement of such element effected by progressive cam movement in said one direction.

16. Apparatus defined in claim 15, wherein the port opening comprises a generally cylindrical passage and the valve element comprises a rod-like member, and means forming an escape aperture intersecting said passage and guiding said rod-like member for lengthwise movement therein, said rod-like member having a longitudinally tapered form to permit escape of fluid from said passage and through the escape aperture by flow through the variable space between the tapered side of such member and the adjacent side of said aperture.

17. Closure control apparatus for a free-closing valve interposed in a conduit operatively to reduce velocity of liquid flowing therein, from various initial values to a reduced final value, and wherein the valve is subjected to surge force of the liquid accompanying abrupt flow reductions effected by movement of such valve toward closed portion, said apparatus comprising piston and coacting fluid cylinder valve-closure-retarding means, variable port means permitting restricted escape of fluid to or from said cylinder accompanying valve closure movement, and escape port control means comprising port-constricting means operable reactively to velocity of liquid flowing in the conduit, port-enlarging spring means resiliently opposing liquid velocity force acting on said port-constricting means, and port-opening locking means actuated with initiation of valve closure movement, to maintain during such closure movement the size of port established by the initial balance between the spring force and velocity reaction force prevailing immediately preceding such closure movement.

18. Closure control apparatus for a free-closing valve interposed in a conduit operatively to reduce velocity of liquid flowing therein, from various initial values to a reduced final value, and wherein the valve tends to move toward closed position more rapidly than permissible, said apparatus comprising piston and coacting fluid cylinder valve-closure-retarding means, fixed escape opening means permitting restricted escape of fluid to or from said cylinder accompanying and limited to initial valve closure movement, variable port means permitting restricted escape of fluid to or from said cylinder accompanying final valve closure movement, and escape port control means comprising port-constricting means operable reactively to velocity of liquid flowing in the conduit, port-enlarging spring means resiliently opposing liquid velocity force acting on said port-constricting means, and port-opening locking means actuated with initiation of valve closure movement, to maintain during such closure movement the size of port established by the initial balance between the spring force and velocity reaction force prevailing immediately preceding such closure movement.

19. Automatic valve closure control apparatus for a valve interposed in a conduit operatively to reduce the velocity of liquid flowing therein from any of various initial values to a final reduced value, and wherein the valve tends to move toward closed position more rapidly than permissible in terms of momentum effects of the liquid back of the valve, said apparatus comprising retarding means connected to said valve resisting valve closure movement and being selectively adjustable to vary the resistance thereof, liquid-actuated means controlled by velocity of the liquid in the conduit and operatively connected to said retarding means for selectively adjusting the same automatically to establish the resistance setting thereof approximately in proportion to such velocity, and locking means maintaining the selected adjustment of said retarding means substantially constant throughout valve closure movement at the value automatically selected by said liquid-actuated means at the initiation of such movement.

References Cited in the file of this patent
UNITED STATES PATENTS

| Number | Name | Date |
| --- | --- | --- |
| 36,319 | Bailey | Aug. 26, 1862 |
| 2,439,118 | Waterman | Apr. 6, 1948 |